US008849867B1

(12) United States Patent
Pilloff (10) Patent No.: US 8,849,867 B1
(45) Date of Patent: Sep. 30, 2014

(54) INTERSECTION CLUSTERING IN A MAP EDITOR

(75) Inventor: Mark D. Pilloff, San Jose, CA (US)

(73) Assignee: Google Inc., Mountain View, CA (US)

(*) Notice: Subject to any disclaimer, the term of this patent is extended or adjusted under 35 U.S.C. 154(b) by 570 days.

(21) Appl. No.: 12/842,830

(22) Filed: Jul. 23, 2010

(51) Int. Cl.
*G06F 7/00* (2006.01)

(52) U.S. Cl.
USPC .......................................... 707/802

(58) Field of Classification Search
USPC .......................... 707/802, 694, 812
See application file for complete search history.

(56) References Cited

U.S. PATENT DOCUMENTS

| | | | | |
|---|---|---|---|---|
| 5,515,283 | A * | 5/1996 | Desai et al. | 701/461 |
| 6,064,941 | A * | 5/2000 | Nimura et al. | 701/416 |
| 6,125,323 | A * | 9/2000 | Nimura et al. | 701/410 |
| 6,249,740 | B1 * | 6/2001 | Ito et al. | 701/420 |
| 6,324,470 | B1 * | 11/2001 | White | 701/533 |
| 6,609,063 | B1 * | 8/2003 | Bender et al. | 701/533 |
| 2003/0130789 | A1 * | 7/2003 | McDonough | 701/209 |
| 2004/0039520 | A1 * | 2/2004 | Khavakh et al. | 701/201 |
| 2006/0071815 | A1 * | 4/2006 | Parsons | 340/916 |
| 2006/0217879 | A1 * | 9/2006 | Ikeuchi et al. | 701/208 |
| 2007/0050134 | A1 * | 3/2007 | Hayashida et al. | 701/209 |
| 2007/0055441 | A1 * | 3/2007 | Retterath et al. | 701/200 |
| 2008/0040033 | A1 * | 2/2008 | Mutoh | 701/209 |
| 2008/0177469 | A1 * | 7/2008 | Geelen et al. | 701/209 |
| 2009/0024319 | A1 * | 1/2009 | Tsuji | 701/209 |
| 2010/0121562 | A1 * | 5/2010 | Nesbitt | 701/200 |
| 2010/0299065 | A1 * | 11/2010 | Mays | 701/209 |
| 2010/0318291 | A1 * | 12/2010 | Gluck | 701/208 |

* cited by examiner

*Primary Examiner* — Mohammed R Uddin
(74) *Attorney, Agent, or Firm* — Fenwick & West LLP (57) ABSTRACT

A system, method, and user interface for locating intersections and adding turn restrictions to the intersections in a map editor. A map editor displays nodes and road segments in a visual map to a user. The user selects a group of nodes that represent a single physical intersection. The map editor identifies the entrance and exits to the intersection and associates each entrance with one or more of the exits. The user then selects an entrance to the intersection. The map editor displays an indicator for each exit associated with the entrance. The appearance of each indicator is based whether it is legally permitted for a vehicle to drive from the entrance, through the intersection, to the exit that corresponds to the exit indicator. The user then enters restriction information for each of the exits, which updates the appearance of the indicators.

17 Claims, 9 Drawing Sheets

INTERSECTION CLUSTERING IN A MAP EDITOR

FIELD OF THE INVENTION

The present invention relates to map editing and more specifically to a map editor configured for locating an intersection and adding turn restrictions to the intersection.

BACKGROUND OF THE INVENTION

Digital maps are found in a wide variety of devices, including car navigation systems, hand-held GPS units, mobile phones, and in many websites such as GOOGLE MAPS and MAPQUEST. Although digital maps are easy to use from an end-user's perspective, creating a digital map is a difficult and time-consuming process. Every digital map begins with a set of raw data corresponding to millions of streets and intersections. The raw map data is derived from a variety of sources, each source providing different amounts and types of information. In many cases, data from different sources is inaccurate and out of date. Oftentimes the data from the different sources are in a format that is not suitable for use in a real map. Integrating data from these heterogeneous sources so that it can be used and displayed properly is an enormous challenge.

In particular, raw map data often lacks information about turn restrictions. For cars that enter an intersection from a particular direction, turn restrictions provide information about the exits available from that intersection. Turn restrictions can be determined from road signs or lane markings. An example of a turn restriction is a sign at a four way intersection stating "no left turns." Navigation devices need to know whether turns are restricted in order to generate a recommended driving route between two points on a map. Without this information, a navigation device is likely to provide erroneous driving instructions. For example, without turn restriction data, a navigation device may instruct a driver to make a U-turn at an intersection where U-turns are in-fact prohibited.

SUMMARY OF THE INVENTION

A map editing system and method is configured to locate a physical intersection in a map and to identify paths between entrances and exits of the intersection that could be affected by a turn restriction. A map editor is configured to display nodes and road segments in an interactive visual map to a user. The map editor receives the user's selection of a group of nodes located within a physical intersection. The map editor subsequently automatically identifies the entrances and exits of the intersection for the selected nodes. Each entrance is associated with one or more of the exits, and these associations are stored into the database. Each of the associations represents a potential path through the intersection that could be subject to a turn restriction.

Additionally, once the intersection is located, information about turn restrictions can be added to the intersection. The map editor receives the user's selection on the map of an entrance to the intersection. The map editor displays a graphical indicator for the selected entrance, as well as separate graphical indicators for each of the exits from the intersection. For each of the exits, the map editor receives a user input specifying whether it is legally permitted for a vehicle to drive from the selected entry point, through the intersection, to the exit. In response, the map editor updates the appearance of the indicators based on the entered information.

In one aspect, the map editor provides a graphical user interface for entering information about turn restrictions. The interface displays nodes and road segments of a physical intersection in a visual map. An indicator that corresponds to an entrance of the intersection is displayed on the map. Separate indicators that correspond to the exits from the intersection are also displayed on the map. The appearance of each exit indicator is based on whether it is legally permitted for a vehicle to drive from the selected entry point, through the intersection, to the exit that corresponds to the exit indicator. Using these various graphical indicators as a visual aid, a user can quickly and easily add turn restrictions to the intersection.

The features and advantages described in this summary and the following detailed description are not all-inclusive. Many additional features and advantages will be apparent to one of ordinary skill in the art in view of the drawings, specification, and claims hereof.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

System Overview

Figure 1:
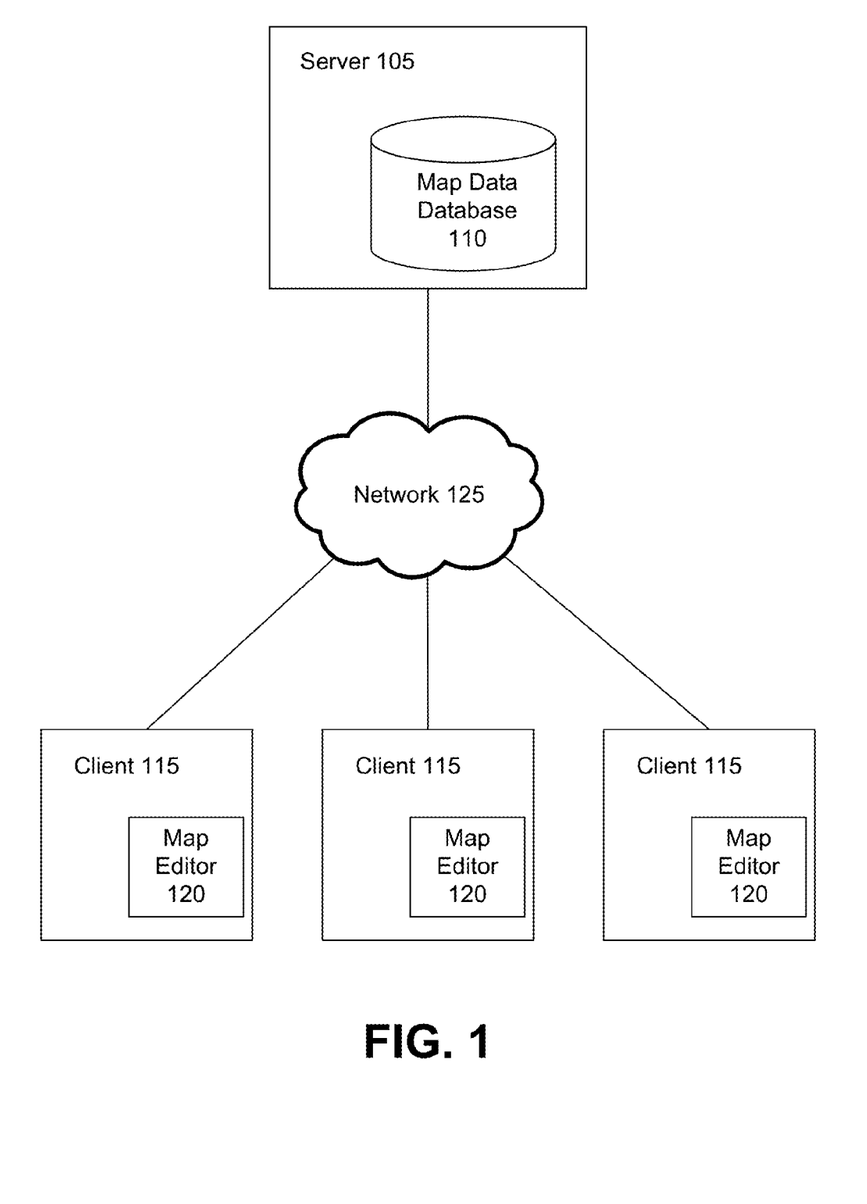
FIG. 1 is a high-level block diagram of a computing environment according to one embodiment.

FIG. 1 is a high-level block diagram that illustrates a computing environment for a map editor, according to one embodiment of the present disclosure. As shown in FIG. 1, the computing environment includes a server 105 connected to a number of client computers 115 through network 125. The network includes but is not limited to any combination of a LAN, MAN, WAN, mobile, wired or wireless network, a private network, or a virtual private network. While only three clients are shown to simplify and clarify the description, it is understood that very large numbers of client computers are supported and can be in communication with the server 105.

Both the server 105 and the clients 115 are computer systems that comprise a CPU, memory, network interface, peripheral interfaces, and other well known components. As is known to one skilled in the art, other types of computers can be used which have different architectures. The server 105 can be implemented on either a single computer, or using multiple computers networked together. The server 105 and the client 115 are also adapted to execute computer program modules for providing functionality described herein. As used herein, the term "module" refers to computer program logic used to provide the specified functionality. Thus, a module can be implemented in hardware, firmware, and/or software. In one embodiment, program modules are stored in on a storage device, loaded into memory and non-transitorily stored therein, and executed by a processor or can be provided from computer program products that are stored in tangible non-transitory computer-readable storage mediums (e.g. RAM, hard disk, or optical/magnetic media).

A map data database 110 is illustrated as being stored in server 105. Alternatively, many other configurations are possible. The database 110 does not need to be physically located within server 105. For example, the database can be placed within client 115, stored in external storage attached to server 105, or stored in network attached storage. Additionally, there may be multiple servers 105 that connect to a single database 110.

The database 110 contains map data that can be used to generate a digital road map. Physical roads are represented in the map data by a list of nodes and road segments that connect those nodes. Each node corresponds to a specific geographic location in the physical world. The data representation for each node includes a set of coordinates (e.g. latitude and longitude, or other coding that can be associated with a specific physical location) and an association with one or more road segments. Each road segment corresponds to a section of a physical road that begins at one node and ends at a different node. The data representation for each road segment can include a length and a number of attributes, such as street name, priority (e.g. highway or local road), speed information, surface type, road width, one-wayness, address ranges, usage (e.g. ramp or trail), etc. Each road segment is further associated with the two nodes (start node and end node). Each road segment can also be associated with one or more turn restrictions. The map data can be obtained from several different sources such as the New York City Open Accessible Space Information System (OASIS) and the U.S. Census Bureau Topologically Integrated Geographic Encoding and Referencing system (TIGER). The map data can also be accessed by map editor 120, modified, and stored back into the database 110.

The client 115 executes map editor 120, which allows a user to interactively modify the map data stored in map data database 110, for example in the process of creating a digital map. The map editor is configured to retrieve map data from database 110. The data is visually displayed to a user as a set of nodes and road segments connecting those nodes. The user interactively selects an intersection on the displayed map. The map editor receives these selections and automatically identifies the entrances and exits to the intersection and associates each entrance with one or more exits. The user can then select an entrance and enter information about whether access to each of the exits of the intersection is permitted from that particular entrance.

Intersection Clustering with the Map Editor

Figure 2:
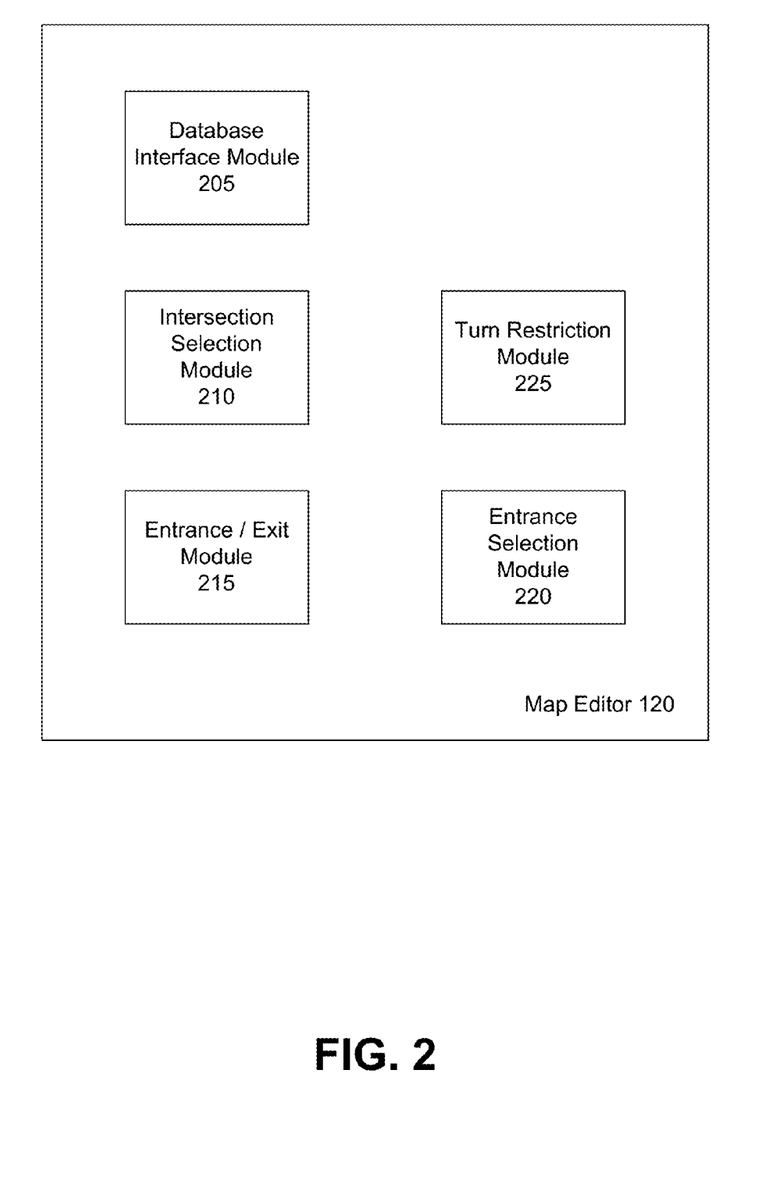
FIG. 2 is a high level block diagram illustrating modules within a map editor according to one embodiment.

FIG. 2 is a high level block diagram illustrating modules within a map editor according to one embodiment. As illustrated, the map editor 120 includes a database interface module 205, an intersection selection module 210, an entrance/exit module 215, an entrance selection module 220, and a turn restriction module 225. Some embodiments of the map editor 120 have different and/or other modules than the ones described herein. Similarly, the functions described herein can be distributed among the modules in accordance with other embodiments in a different manner than is described here. The detailed operation of these modules is explained below by reference to FIG. 3, which illustrates a process flow diagram for clustering intersections and adding turn restrictions.

Figure 3:
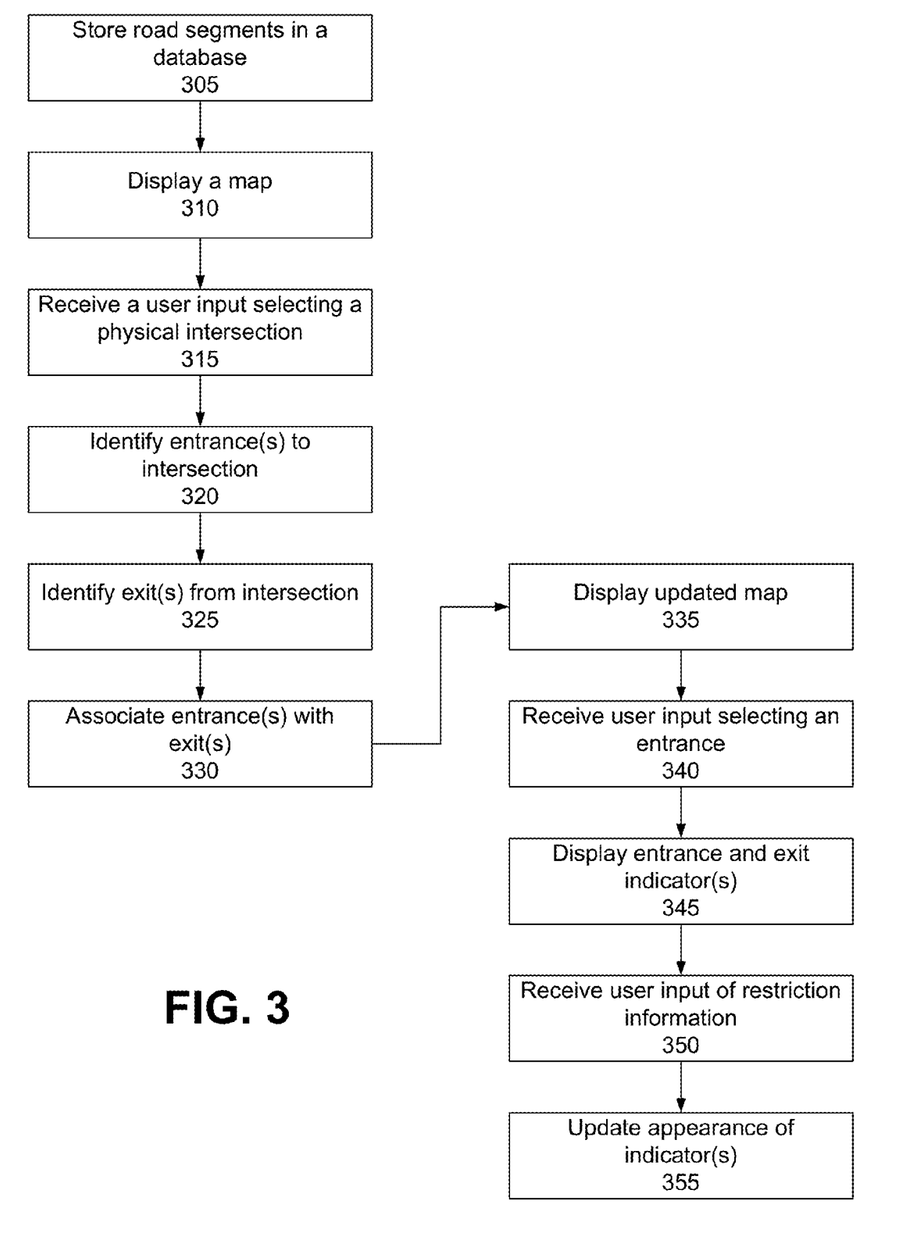
FIG. 3 is a process flow diagram for clustering intersections and adding turn restrictions according to one embodiment.

The database interface module 205 stores 305 and retrieves map data to and from the database 110. As discussed above, physical roads in the real world are represented in the map data as nodes and road segments that connect those nodes. Multiple road segments may connect to a single node. Multiple nodes can also be located within a single physical intersection. A physical intersection is a location in the real world where a road directly connects or meets with one or more other roads (e.g. T-intersections, 4-way intersections, traffic circles).

Figure 4:
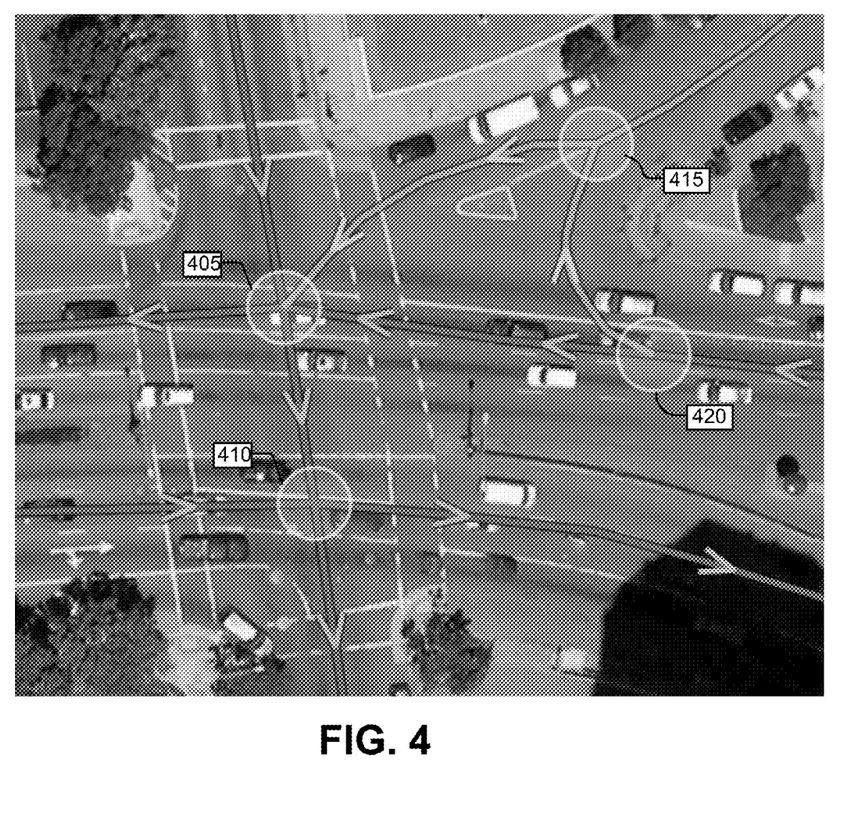
FIG. 4 illustrates the user interface of the map editor before an intersection is selected.

In response to a user command, the intersection selection modules 210 displays 310 the nodes and road segments in the form of a visual map to a user. The nodes and road segments can be displayed in conjunction with a satellite map of the surrounding area. For example, referring to FIG. 4, illustrated is a user interface for displaying nodes and road segments. The user interface includes map with four nodes 405, 410, 415, and 420 that are located within a single physical intersection. Some of the displayed road segments connect the displayed nodes to each other. Other displayed road segments connect these nodes with other nodes that are not shown on the map.

Figure 5:
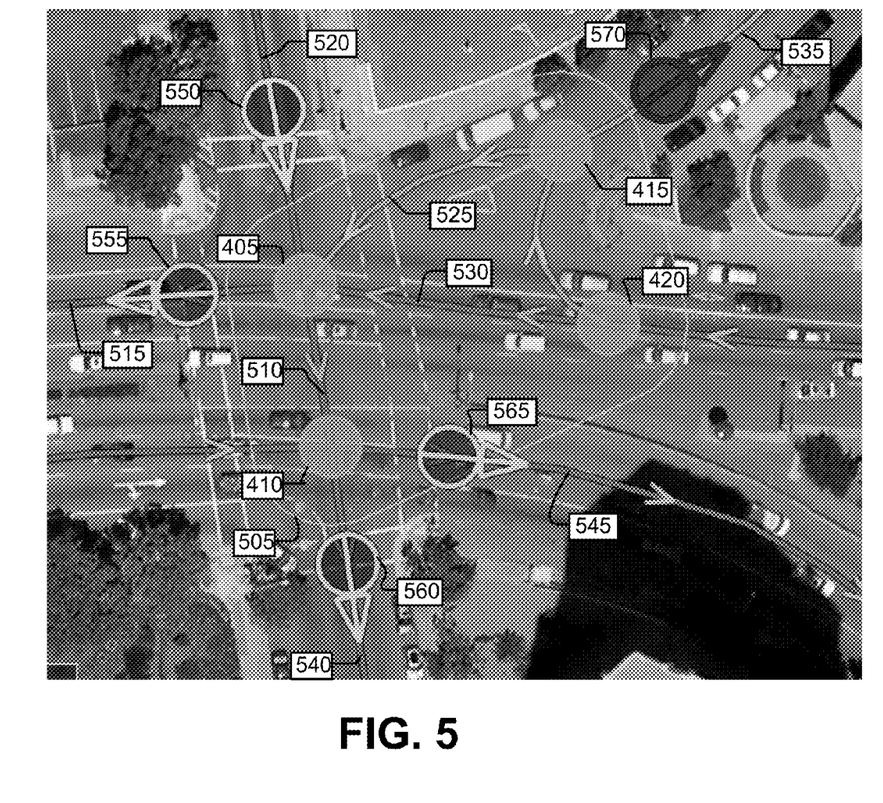
FIG. 5 illustrates the user interface of the map editor after an intersection is selected.

The intersection selection module 210 then receives 315 a user input selecting a physical intersection from amongst the roads and node segments in the displayed map. The user can select the intersection by drawing a box (or other polygon) around an area of the screen that represents an intersection. Alternatively, the user can select an intersection by individually selecting a set of nodes that are located within a physical intersection. The map editor associates the selected nodes with each other to form an intersection cluster. The map editor assigns a unique identifier to the intersection cluster that distinguishes it from other intersection clusters. For example, referring to FIG. 5, illustrated is the user interface of FIG. 4 after the nodes of an intersection are selected. The user has selected the intersection that contains nodes 405, 410, 415, and 420. These nodes are associated with each other to form an intersection cluster 505, which is highlighted in yellow.

Next, the entrance/exit module 215 automatically identifies 320 the entrances to the intersection, based on features of the road segments that couple to the nodes of the intersection. The entrances are road segments having a direction of travel leading towards the intersection. The entrance/exit module 215 also automatically identifies 325 exits from the intersection. The exits are road segments having a direction of travel leading away from the intersection. Each entrance and exit is assigned an identifier.

The entrance/exit module 215 automatically identifies entrances and exits by analyzing each node of the intersection and the road segments connected to each node. First, the entrance/exit module identifies one of the nodes of the intersection to analyze ("analyzed node"). The analyzed node can be arbitrarily identified because the nodes can be analyzed in any order. Referring again to FIG. 5, suppose that node 405 is identified as the analyzed node. The entrance/exit module then automatically identifies all the road segments connected to the analyzed node 405, which includes segments 510, 515, 520, 525 and 530. The entrance/exit module classifies each of these segments as either an internal segment or an external segment.

Internal segments connect the analyzed node 405 to a node that is within the intersection. For example, segments 510, 525, and 530 are internal segments. External segments connect the analyzed node 405 to a node that is outside of the intersection. For example, segments 515 and 520 are external segments. External segments 515 and 520 are further classified based on their direction of travel. If an external segment has a direction of travel that leads towards the analyzed node 405, it is an "entrance." For example, segment 520 is an entrance. If an external segment has a direction of travel that leads away from the analyzed node 405, it is an "exit." For example, segment 515 is an exit. If an external segment has two directions of travel, it is both an "entrance" and an "exit." This process is repeated until all nodes 405-420 of the intersection are analyzed, resulting in a comprehensive list of all the exits and entrances of the intersection.

For each pair of entrances and exits, the entrance/exit module 215 determines whether the exit is an "unreachable" or "potentially reachable" exit for that entrance. An exit is unreachable if a vehicle traveling into the intersection via the entrance segment can drive through the intersection to the exit segment only by illegally driving against the flow of traffic. An exit is potentially reachable if, assuming that no turn restrictions exist, a vehicle traveling into the intersection via the entrance segment can drive through the intersection to the exit segment without going against the flow of traffic.

In one embodiment, the entrance/exit module 215 applies a path finding algorithm, such as Djikstra or A*, to each pair of entrances and exits to determine whether a path exists in the intersection between the entrance segment and the exit segment. Path finding algorithms are well known in the art and will not be described herein. If a path exists, the exit is a potentially reachable exit for the given entrance. If a path does not exist, the exit is unreachable for the given entrance. For example, referring again to FIG. 5, a vehicle starting at entrance segment 520 cannot reach exit segment 535 without driving against the flow of traffic on either segment 525 or 530. By applying a path finding algorithm between entrance segment 520 and exit segment 535, the entrance/exit module 215 determines that no path exists, thus exit 535 is an unreachable exit for entrance 520. A path does exist between entrance 520 and exit segments 515, 540 and 545, thus these exit segments are considered potentially reachable exits for entrance segment 520.

The entrance/exit module 215 associates 330 each entrance to the intersection with each of its potentially reachable exits to describe a set of turn restrictions specific to the intersection. In one embodiment, turn restrictions are instantiated in the database to link the entrances and potentially reachable exits. Each instantiated turn restriction has at least three fields: (1) an identifier for an entrance segment, (2) an identifier for an exit segment, and (3) a restriction field. The restriction field indicates whether it is legally permitted for a vehicle to travel from the entrance segment, through the intersection, to the exit segment. For example, if there is a sign at an entrance to an intersection prohibiting left turns, turning left from that entrance segment onto an adjacent exit segment would not be legally permitted. The restriction field can contain a "yes" value (or equivalent flag or bit, e.g., "1") to indicate that travel between two segments is not permitted, or "no" (or equivalent flag or bit, e.g., "0") to indicate that travel between two segments is permitted. Additionally, when the turn restriction is first instantiated, the restriction field may be "unknown" or NULL because information about driving restrictions in the intersection has yet to be entered by the user. The following is an example of an instantiated turn restriction:

| Entrance Segment | Exit Segment | Restriction Field |
|---|---|---|
| Segment ABC | Segment XYZ | Yes |

The entrance/exit module 215 then displays 335 the selected intersection in the visual map. The intersection may be displayed in conjunction with a satellite image of the physical intersection. The intersection itself is highlighted in the display. For example, in FIG. 5, the intersection 505 is highlighted in a highlight color (e.g., yellow) that surrounds all the nodes 405-420 of the intersection. Further, indicators 550-570 of turn restrictions can be shown in the display, as will be described in the following section. The intersection cluster and the turn restrictions can also be stored into the database 110.

The disclosed embodiments beneficially allow for an intersection, its entrances, and its exits to be quickly identified. By analyzing each pair of entrances to and exits from the intersection, the map editor also automatically identifies the paths through the intersection that could potentially be affected by a turn restriction.

Adding Turn Restrictions to the Intersection with the Map Editor

Once an intersection is located and turn restrictions are instantiated, the map editor 120 is ready to receive a user input specifying, for each entrance, whether it is legally permitted for a vehicle to drive from that entry point, through the intersection, to its associated exit segments. This is hereinafter referred to as "restriction information." In other words, the map editor receives information about whether access to each of the exits of the intersection is permitted or restricted. For example, it is not permitted to travel through an intersection to an exit if there is a road sign prohibiting a driver from turning towards that exit (e.g. "no u-turns", "no left turns", "no right turns") or lane markings prohibiting turns. The following paragraphs describe a process and user interface for adding turn restriction information to an intersection, which will be described by reference to the modules in FIG. 2 and the process of FIG. 3.

As described above, the entrance/exit module 215 displays 335 the nodes and segments of a physical intersection in a visual map. Subsequently, the entrance selection module 220 receives 340 a user input selecting one of the entrances to the intersection. The user input can be in any form, such as a mouse click or keyboard entry that cycles from one entrance to the next.

In response, the entrance selection module 220 displays 345 a visual indicator for the selected entrance. The entrance selection module also displays 345 separate visual indicators for each of the exits from the intersection. An indicator is any visually distinctive element, including but not limited to an icon, coloring, shading, animation, 3-dimensional effects, etc. Referring again to FIG. 5, in one embodiment, the indicators are entrance icons 550 and exit icons 555-570. The icons have arrows that point either towards or away from the intersection, depending on whether the icons correspond to an entrance or exit of the intersection. Entrance icons 550 have arrows that point towards the intersection. Exit icons 555-570 have arrows that point away from the intersection. The icons are overlaid onto their corresponding entrance or exit segments.

The appearance of an exit icon is directly related to whether there is a restriction that prevents a vehicle from driving from the selected entry point, through the intersection, to the exit that corresponds to the exit icon. The following is a table that illustrates how the appearance of an exit icon is affected by the status of the restriction field in the instantiated turn restrictions.

| Status of restriction field | Appearance of exit icon |
|---|---|
| Yes (access to exit is restricted) | Red Color |
| No (access to exit is not restricted) | Green Color |
| Unknown | Light Pink Color |

For example. referring again to FIG. 5, exit icons 555, 560, and 565 are displayed in light pink because the restriction information for the exits corresponding to these icons has not been entered and is still unknown. Further, if an exit is deemed unreachable by the entrance/exit module 215, the exit icon corresponding to the exit takes on a different appearance. For example, exit icon 570 is displayed in black because it is an exit that is unreachable from the selected entrance 520.

The appearance of an entrance icon is directly related to whether the restriction information for each of the potentially reachable exits associated with the selected entry point is known. For example, referring again to FIG. 5, entrance icon 550 is displayed in light yellow because the restriction information for each of the potentially reachable exits 515, 540, and 545 associated with entrance 520 has not been entered and is still unknown. If the restriction information for each of the exits 515, 540, and 545 was known, then entrance icon 550 would be displayed in a bright yellow color.

The turn restriction module 225 receives 350 a user input of restriction information for each of the potentially reachable exits associated with the selected entrance. The user can input the restriction information in any of a number of ways, such as by clicking on an exit indicator, selecting a restriction option from a drop-down list, or entering the information through a keyboard, etc. The restriction information can be entered individually for each exit, or it can be entered for all exits at the same time. The following is an exemplary list of keyboard commands that are used to enter the restriction information:

Spacebar Disallow all undecided exits
U Restrict all U-turns from the selected entry point
L Restrict left turns and U-turns from the selected entry point
R Restrict right turns and U-turns from the selected entry point
O Allow all turns from the selected entry point
Shift-O Allow all turns in the cluster from every entry point The restriction information is stored into its corresponding turn restriction in the database 110.

Figure 6:
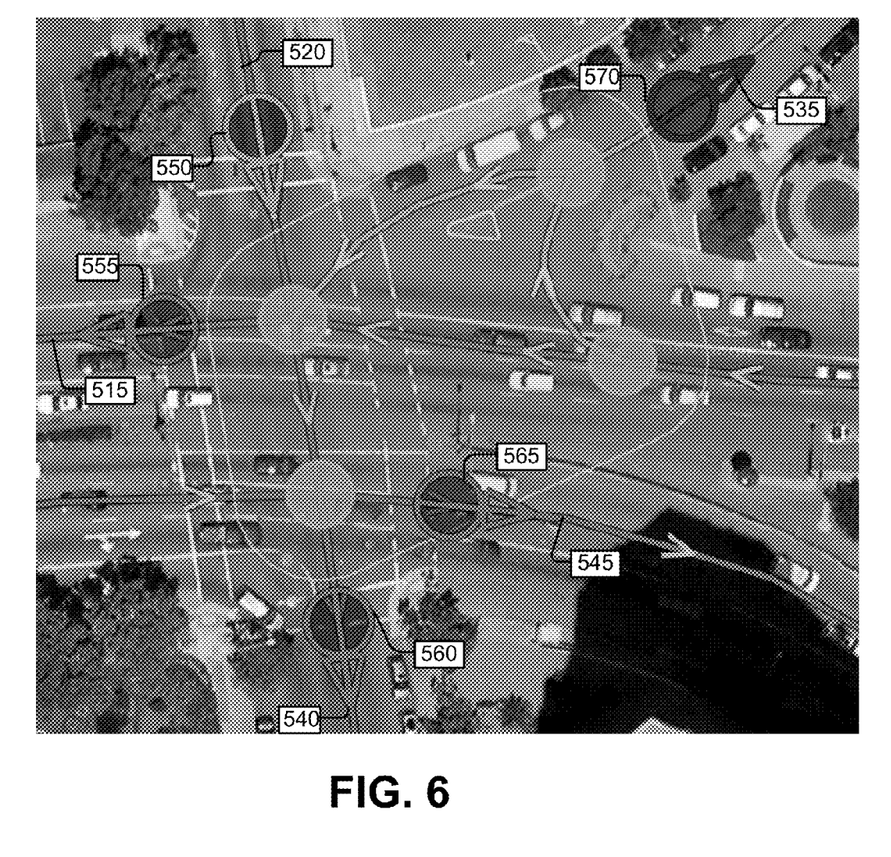
FIG. 6 illustrates the user interface of the map editor after turn restrictions are added to one set of entrance/exits.

In response to receiving 350 the restriction information, the turn restriction module 230 updates 355 the appearance of the displayed indicators. As explained above, the appearance of the exit and entrance indicators is directly related to whether there are any restrictions that prevent a vehicle from driving through the intersection from the selected entry point to the exits. Referring to FIG. 6, illustrated is the user interface of the map editor after restriction information is received from the user. Exit segments 515, 540, and 545 are the potentially reachable exits associated with selected entrance segment 520. The user has indicated that there are no restrictions preventing a vehicle from driving towards these exits. As a result, exit icons 555, 560, and 565 are now displayed in a green color, whereas before they were light pink. Exit icon 570 is still displayed in black because it corresponds to an unreachable exit 535. Entrance icon 550 is now displayed in a bright yellow color to indicate that the restriction information for each of the exits 515, 540, and 545 associated with the selected entrance 520 is now known.

Figure 7:
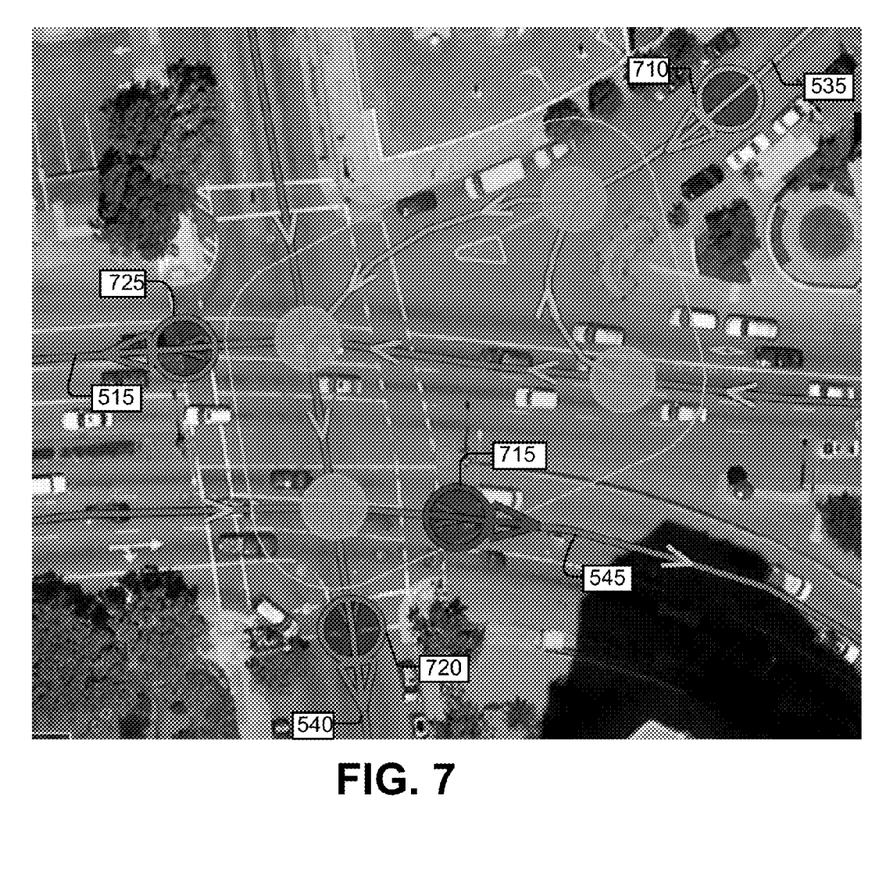
FIG. 7 illustrates the user interface of the map editor after turn restrictions are added to another set of entrance/exits.

The process of selecting 340 entrances, displaying 345 entrance and exit indicators, and receiving 350 user input of restriction information is repeated by the map editor 120 for each entrance to the intersection. Each time a new entrance is selected, new entrance and exit indicators are displayed. Turning to FIG. 7, illustrated is the user interface of the map editor after restriction information is received for a different entrance. The user has selected an entrance 535 to the intersection. Entrance icon 710 corresponds to the selected entrance 535. Exit icons 715, 720, and 725 correspond to the exits from the intersection. The user enters restriction information indicating that it is not permitted to turn onto exit 545 from the selected entrance 535. In response, exit icon 715 is displayed in red. The user enters restriction information indicating that it is permitted to drive through the intersection to exits 515 and 540 from the selected entrance 535. In response, exit icons 720 and 725 are displayed in green.

Figure 8:
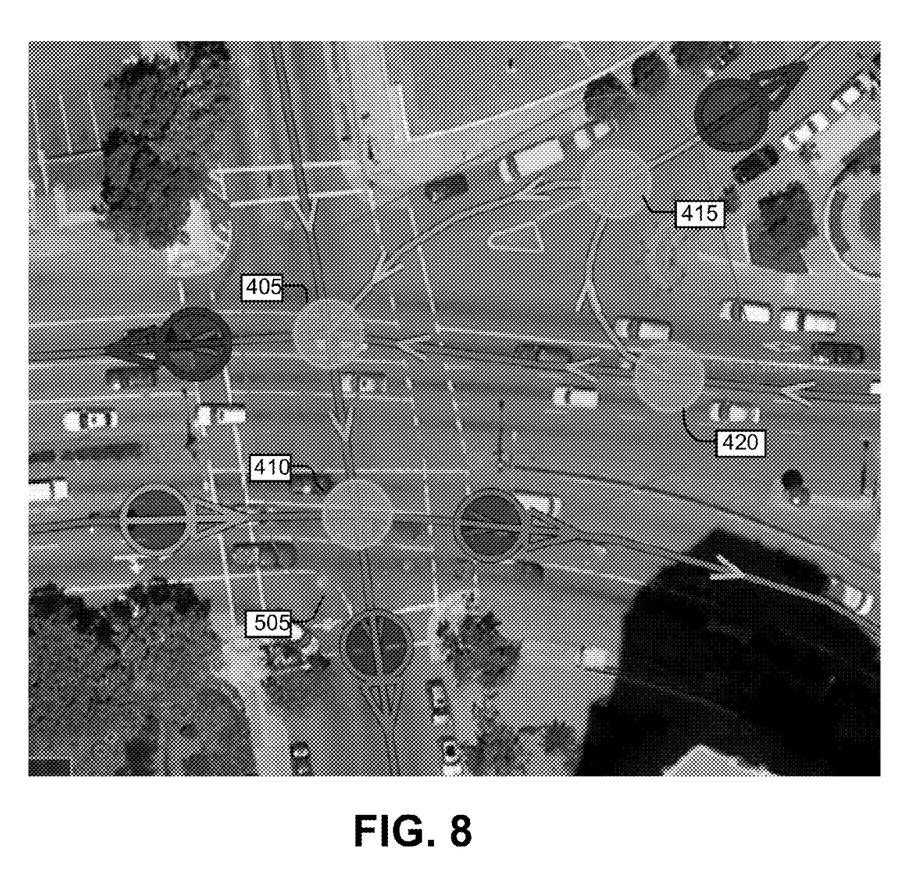
FIG. 8 illustrates the user interface of the map editor after turn restrictions have been entered for every set of entrances/exits and the intersection is marked as complete.

Once the restriction information for every pair of entrances and exits is known, the appearance of the displayed intersection is updated. The updated appearance can include, by way of example only, a change in color or shading, or the display of an additional indicator. The user can then enter a command to mark the intersection as complete, which causes an additional change in the appearance of the displayed intersection. Referring to FIG. 8, illustrated is the user interface of the map editor after an intersection has been marked as complete. Nodes 410, 405, 415, and 420 are now highlighted in a gold color, whereas before they were color-less. The entire intersection 505 is now highlighted in green, whereas before it was highlighted in yellow.

Figure 9:
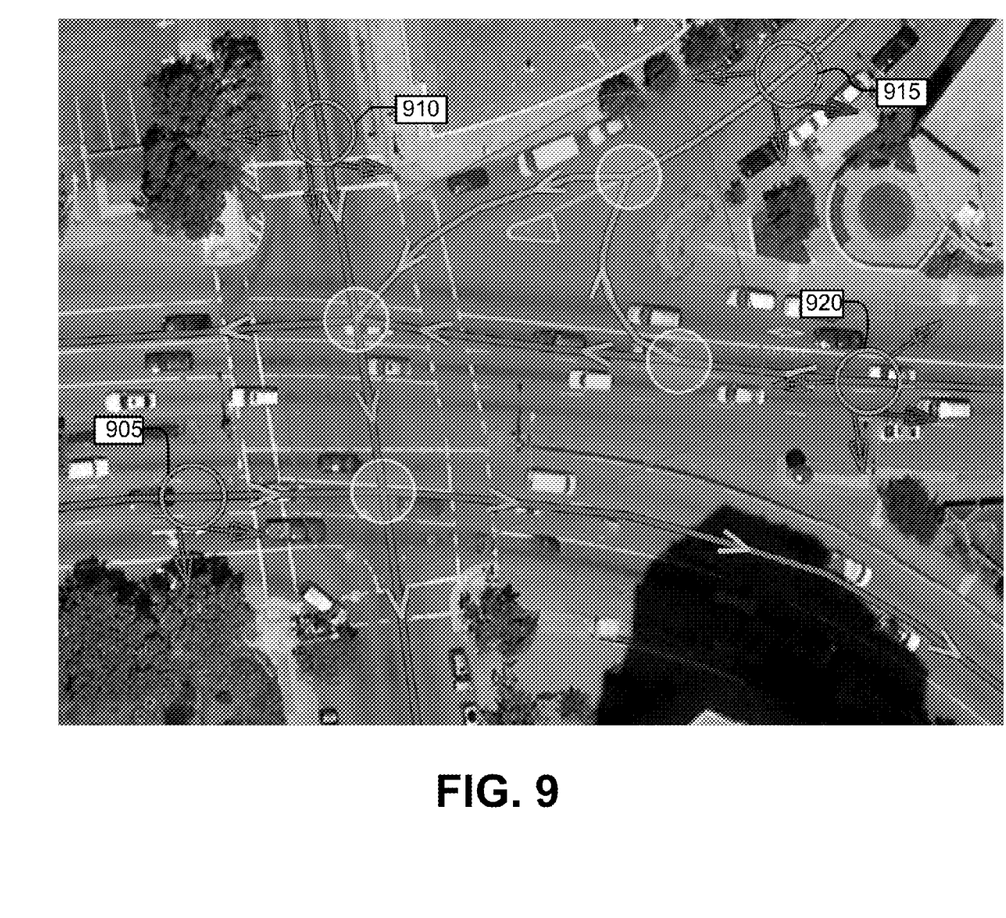
FIG. 9 illustrates the user interface of the map editor summarizing the turn restrictions for an intersection.

In a further embodiment, the turn restriction module 225 can display a visual summary of the instantiated turn restrictions using special indicators. The summary can be displayed at any time, including before or after all the restriction information is received for a particular intersection. The summary provides an overview of all the turn restrictions of an intersection, which helps the user to understand if he/she has entered any erroneous information. For example, referring to FIG. 9, illustrated is the user interface of the map editor that displays a visual summary of the turn restrictions for an intersection. In this figure, the restriction information for each of the entrance/exit pairs has already been received. A separate visual indicator 905-920 is displayed for each of the entrances to the intersection. The indicators are overlaid onto their respective entrance segments. In this embodiment, each indicator comprises a circular icon with one or more outwards facing arrows. Each arrow corresponds to an exit from the intersection. The angular orientation of the arrow corresponds to the angular orientation of the exit. The color of the arrow corresponds to the whether access to the exit is permitted. A green arrow indicates that access to the exit is permitted from the entrance. A red arrow indicates that access to the exit is not permitted from the entrance. Other graphical variations of indicators can be used as well, with different shapes and colors used to represent the semantics of the turn restriction.

The disclosed embodiments beneficially allow for a user of a map editor to quickly enter information about turn restrictions for every possible combination of entrances to and exits from an intersection. The disclosed user interface also facilitates a user's understanding of turn restrictions as they are being entered and facilitates review of the turn restrictions after all the information is complete.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "identifying," "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process locating intersections and adding turn restrictions to the intersection through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer implemented method for map editing in a map editor, comprising:
   storing nodes and road segments associated with the nodes in a database;
   displaying, by the map editor, a map of the nodes and road segments;
   receiving, by the map editor, a selection of a single physical intersection displayed in the map, wherein the single physical intersection is represented collectively by a plurality of the nodes;
   automatically identifying, by the map editor, an entrance segment from the road segments displayed in the map that are connected to the plurality of the nodes, the entrance segment corresponding to an entrance to the single physical intersection represented collectively by the plurality of the nodes;
   automatically identifying, by the map editor, one or more exit segments from the road segments displayed in the map that are connected to the plurality of the nodes, the one or more exit segments corresponding to exits from the single physical intersection represented collectively by the plurality of the nodes;
   automatically identifying, by the map editor, a set of the exit segments that are potentially reachable from the entrance segment via the single physical intersection represented collectively by the plurality of the nodes;
   storing associations between the entrance segment and the set of the exit segments into the database, wherein storing comprises instantiating data fields for storing information about whether it is legally permitted for a vehicle to drive from the entrance segment, through the intersection, to the set of the exit segments; and
   displaying an exit indicator corresponding to an exit segment from the set of the exit segments, an appearance of the exit indicator based on the information stored in the data fields and indicating whether it is legally permitted for a vehicle to drive from the entrance segment, through the physical intersection, to the exit segment.

2. The method of claim 1, wherein identifying a set of the exit segments that are potentially reachable comprises applying a path-finding algorithm to determine if a path exists between the entrance segment and the exit segments.

3. The method of claim 1, wherein the entrance segment is identified from the road segments based on directions of travel of the road segments.

4. The method of claim 1, wherein the one or more exit segment are identified from the road segments based on directions of travel of the road segments.

5. The method of claim 1, further comprising:
   receiving a selection of an entrance to the intersection;
   displaying an entrance indicator corresponding to the entrance; and
   displaying a plurality of exit indicators, each exit indicator corresponding to an exit that is associated with the entrance.

6. The method of claim 5, wherein each exit indicator from the plurality of exit indicators has an appearance based on whether it is legally permitted for a vehicle to drive from the selected entrance, through the intersection, to the exit that corresponds to the exit indicator.

7. The method of claim 5, further comprising:
   receiving information indicating whether it is legally permitted for a vehicle to drive from the selected entrance, through the intersection, to one of the exits from the intersection; and
   storing the information into the database.

8. A system for editing map data, comprising:
   a non-transitory computer-readable storage medium storing computer code for:
      storing nodes and road segments associated with the nodes in a database;

displaying, by a map editor, a map of the nodes and road segments;

receiving, by the map editor, a selection of a single physical intersection displayed in the map, wherein the single physical intersection is represented collectively by a plurality of the nodes;

automatically identifying, by the map editor, an entrance segment from the road segments displayed in the map that are connected to the plurality of the nodes, the entrance segment corresponding to an entrance to the single physical intersection represented collectively by the plurality of the nodes;

automatically identifying, by the map editor, one or more exit segments from the road segments displayed in the map that are connected to the plurality of the nodes, the one or more exit segments corresponding to exits from the single physical intersection represented collectively by the plurality of the nodes;

automatically identifying, by the map editor, a set of the exit segments that are potentially reachable from the entrance segment via the single physical intersection represented collectively by the plurality of the nodes;

storing associations between the entrance segment and the set of the exit segments into the database, wherein storing comprises instantiating data fields for storing information about whether it is legally permitted for a vehicle to drive from the entrance segment, through the intersection, to the set of the exit segments; and displaying an exit indicator corresponding to an exit segment from the set of the exit segments, an appearance of the exit indicator based on the information stored in the data fields and indicating whether it is legally permitted for a vehicle to drive from the entrance segment, through the physical intersection, to the exit segment; and a processor for executing the computer code.

9. A non-transitory computer-readable storage medium storing computer code, that when executed by a processor, cause the processor to:

store nodes and road segments associated with the nodes in a database;

display, by a map editor, a map of the nodes and road segments;

receive, by the map editor, a selection of a single physical intersection displayed in the map, wherein the single physical intersection is represented collectively by a plurality of the nodes;

automatically identify, by the map editor, an entrance segment from the road segments displayed in the map that are connected to the plurality of the nodes, the entrance segment corresponding to an entrance to the single physical intersection represented collectively by the plurality of the nodes;

automatically identify, by the map editor, one or more exit segments from the road segments displayed in the map that are connected to the plurality of the nodes, the one or more exit segments corresponding to exits from the single physical intersection represented collectively by the plurality of the nodes;

automatically identify, by the map editor, a set of the exit segments that are potentially reachable from the entrance segment via the single physical intersection represented collectively by the plurality of the nodes; and store associations between the entrance segment and the set of the exit segments into the database, wherein storing comprises instantiating data fields for storing information about whether it is legally permitted for a vehicle to drive from the entrance segment, through the intersection, to the set of the exit segments; and display an exit indicator corresponding to an exit segment from the set of the exit segments, an appearance of the exit indicator based on the information stored in the data fields and indicating whether it is legally permitted for a vehicle to drive from the entrance segment, through the physical intersection, to the exit segment.

10. A computer implemented method for editing turn restrictions in a map editor, comprising:

storing nodes and road segments associated with the nodes in a database, wherein a plurality of the nodes collectively represents a single physical intersection;

displaying, by the map editor, a map of the nodes and road segments;

receiving, by the map editor, a selection of an entrance to the single physical intersection represented collectively by the plurality of the nodes;

displaying, by the map editor, one or more exit indicators on the map of the nodes and road segments, the exit indicators displayed at locations on the map corresponding to exits from the single physical intersection represented collectively by the plurality of the nodes;

receiving, by the map editor, turn restriction information indicating whether it is legally permitted for a vehicle to drive from the selected entrance, through the single physical intersection represented collectively by the plurality of the nodes, to an exit from the single physical intersection represented collectively by the plurality of the nodes;

updating, by the map editor, an appearance of an exit indicator of the one or more exit indicators that corresponds to the exit responsive to the turn restriction information, the appearance of the exit indicator updated to indicate whether it is legally permitted for a vehicle to drive from the selected entrance, through the intersection, to the exit from the single physical intersection represented collectively by the plurality of the nodes; and storing the turn restriction information into the database.

11. The method of claim 10, further comprising displaying an entrance indicator corresponding to the selected entrance.

12. The method of claim 11, wherein the entrance indicator has an appearance based on whether it is legally permitted for a vehicle to drive from the entrance, through the intersection, to each exit associated with the entrance, is known.

13. A system for editing map data, comprising:

a non-transitory computer-readable storage medium storing computer code for:

storing nodes and road segments associated with the nodes in a database, wherein a plurality of the nodes collectively represents a single physical intersection;

displaying, by a map editor, a map of the nodes and road segments;

receiving, by the map editor, a selection of an entrance to the single physical intersection represented collectively by the plurality of the nodes;

displaying, by the map editor, one or more exit indicators on the map of the nodes and road segments, the exit indicators displayed at locations on the map corresponding to exits from the single physical intersection represented collectively by the plurality of the nodes;

receiving, by the map editor, turn restriction information indicating whether it is legally permitted for a vehicle to drive from the selected entrance, through the single physical intersection represented collectively by the plurality of the nodes, to an exit from the single physical intersection represented collectively by the plurality of the nodes;

updating, by the map editor, an appearance of an exit indicator of the one or more exit indicators that corresponds to the exit responsive to the turn restriction information, the appearance of the exit indicator updated to indicate whether it is legally permitted for a vehicle to drive from the selected entrance, through the intersection, to the exit from the single physical intersection represented collectively by the plurality of the nodes; and storing the turn restriction information into the database; and a processor for executing the computer code.

14. A non-transitory computer-readable storage medium storing computer code, that when executed by a processor, cause the processor to:

store nodes and road segments associated with the nodes in a database, wherein a plurality of the nodes collectively represents a single physical intersection;

display, by a map editor, a map of the nodes and road segments;

receive, by the map editor, a selection of an entrance to the single physical intersection represented collectively by the plurality of the nodes;

display, by the map editor, one or more exit indicators on the map of the nodes and road segments, the exit indicators displayed at locations on the map corresponding to exits from the single physical intersection represented collectively by the plurality of the nodes;

receive, by the map editor, turn restriction information indicating whether it is legally permitted for a vehicle to drive from the selected entrance, through the single physical intersection represented collectively by the plurality of the nodes, to an exit from the single physical intersection represented collectively by the plurality of the nodes;

update, by the map editor, an appearance of an exit indicator of the one or more exit indicators that corresponds to the exit responsive to the turn restriction information, the appearance of the exit indicator updated to indicate whether it is legally permitted for a vehicle to drive from the selected entrance, through the intersection, to the exit from the single physical intersection represented collectively by the plurality of the nodes; and store the turn restriction information into the database.

15. A non-transitory computer-readable storage medium storing a computer program executable by a processor, for producing a user interface of a map editor, the user interface comprising:

a map that includes nodes and road segments, wherein a plurality of the nodes collectively represent a single physical intersection, the road segments including both entrances and exits of the single physical intersection represented collectively by the plurality of the nodes;

an entrance indicator at a location on the map corresponding to one of the entrances to the single physical intersection represented collectively by the plurality of nodes; and one or more exit indicators at locations on the map corresponding to the exits from the single physical intersection represented collectively by the plurality of the nodes, each exit indicator having an appearance based on whether it is legally permitted for a vehicle to drive from the entrance that corresponds to the entrance indicator, through the single physical intersection represented collectively by the plurality of the nodes, to the exit that corresponds to the exit indicator, wherein the appearance of each exit indicator is further based on whether a vehicle is unable to reach the exit that corresponds to the exit indicator, from the entrance that corresponds to the entrance indicator, without driving through the intersection against the flow of traffic, wherein the entrance indicator has an appearance based on whether it is legally permitted for a vehicle to drive from the entrance that corresponds to the entrance indicator, through the intersection, to each exit associated with the entrance, is known.

16. The storage medium of claim 15, wherein each exit indicator comprises an arrow that points away from the intersection.

17. The storage medium of claim 15, wherein the entrance indicator comprises an arrow that points towards the intersection.

* * * * *